United States Patent [19]

Eason

[11] Patent Number: 4,457,061

[45] Date of Patent: Jul. 3, 1984

[54] HARMONIC BALANCER INSTALLER

[75] Inventor: Lloyd R. Eason, Concord, Mich.

[73] Assignee: Dowley Manufacturing, Inc., Spring Arbor, Mich.

[21] Appl. No.: 363,941

[22] Filed: Mar. 31, 1982

[51] Int. Cl.[3] .............. B23P 19/04

[52] U.S. Cl. .............. 29/264; 29/263; 403/299

[58] Field of Search .............. 29/256, 258, 266, 234, 29/263, 264, 265, 273, 271, 274; 81/53.2; 403/299, 19, 258, 259; 411/366, 395, 378, 427

[56] References Cited

U.S. PATENT DOCUMENTS

| | | | |
|---|---|---|---|
| 1,521,202 | 12/1924 | Osgood . | |
| 2,340,986 | 2/1944 | Roberts et al. | 29/273 |
| 2,499,758 | 3/1950 | Kayfetz | 29/273 |
| 2,534,662 | 12/1950 | Froom | 411/378 X |
| 2,721,377 | 10/1955 | Hedlund | 29/264 |
| 2,798,247 | 7/1957 | Sladky et al. | 403/258 X |
| 2,916,813 | 12/1959 | Belanger | 29/256 |
| 3,139,676 | 7/1964 | Grover | 29/256 |
| 3,490,132 | 1/1970 | Kosters et al. | 29/401 |
| 4,259,774 | 4/1981 | Dolinski et al. | 29/263 |

FOREIGN PATENT DOCUMENTS

| | | | |
|---|---|---|---|
| 485518 | 5/1938 | United Kingdom | 29/274 |
| 783614 | 9/1957 | United Kingdom | 29/273 |

*Primary Examiner*—Frederick R. Schmidt
*Assistant Examiner*—Steven P. Schad
*Attorney, Agent, or Firm*—Beaman & Beaman

[57] ABSTRACT

A universal tool for installing harmonic balancers upon the end of an internal combustion engine crankshaft. The tool comprises an elongated threaded shaft having an inner end which includes a removable threaded adapter for attaching the shaft to the end of the crankshaft by means of an axial threaded hole in the crankshaft end. A bolt connects the threaded adapter to the shaft, and a thrust bearing slidably mounted upon the shaft is axially forced into engagement with the balancer by a shaft mounted nut whereby rotation of the nut forces the thrust bearing against the balancer pushing the balancer upon the crankshaft. The use of adapters having various sizes and thread specifications permits the tool to be employed with a wide variety of crankshaft sizes and models.

6 Claims, 7 Drawing Figures

HARMONIC BALANCER INSTALLER

BACKGROUND OF THE INVENTION

The installation of mechanical components upon a shaft often requires special tools for producing the necessary axial force to assemble the parts. For instance, wheels, gears, collars, sleeves, and the like are commonly installed upon shafts, within or without keys, by the use of presses or arbors for producing the necessary axial force on the component being mounted on the shaft.

Where installation of a part upon a shaft cannot be accomplished by a conventional arbor or press, it is known to provide the shaft with a shoulder, recess, or the like which may be engaged by installation equipment to force the part upon the shaft. Also, it is known to provide the end of the shaft with a threaded hole, or a threaded stud, wherein the desired axial forces may be achieved.

For instance, U.S. Pat. Nos. 1,521,202 and 3,490,132 disclose tools used in conjunction with shaft mounted parts wherein a threaded hole in the end of the shaft is used to support the tool during use. With this type of device, it is necessary, of course, that the threaded portion of the tool received within the threaded shaft bore have threads complimentary to each other in order to achieve the desired connection. Accordingly, a tool must be specifically designed for use with a particular shaft and threaded hole, and such a tool does not have "universal" application.

Harmonic balancers are commonly installed upon the nose end of the crankshaft of an internal combustion engine for the purpose of absorbing and dissipating crankshaft vibrations. Such balancers normally incorporate elastomer vibration dampening elements, and often function as a drive pulley engagable by a belt for supplying power to alternators, power steering pumps, air conditioners, and the like. As the harmonic balancer is mounted at the lower region of the engine access thereto is usually limited, and considerable difficulty is often experienced in the servicing of harmonic balancer wherein a new balancer must be installed upon the crankshaft end.

Complicating the installation of harmonic balancers upon a crankshaft is the fact that while the end of an internal combustion engine crankshaft is commonly provided with a threaded hole, the size and thread specifications of such holes will vary between engine manufacturers, the size or model of engine, and other specification variations. Accordingly, it is necessary to utilize a balancer installation tool having the specific thread specifications which match with the crankshaft threaded hole, and with prior balancer installation tools, the need for a number of various size tools places an economic burden upon the mechanic, and complicates engine servicing.

It is an object of the invention to provide an installation tool for a harmonic balancer for internal combustion engine crankshafts wherein a single tool has "universal" aspects wherein the tool may be used with a wide variety of engine crankshafts having threaded holes of various specifications.

Another object of the invention is to provide a tool for installing balancers upon engine crankshafts utilizing a crankshaft threaded hole wherein a small threaded adapter is used to accommodate the tool to a specific crankshaft, and the adapter is received within a recess within the tool.

Yet another object of the invention is to provide a universal balancer installation tool wherein a plurality of threaded adapters may be used therewith, and only the adapter is required to be changed to accommodate the tool to various sizes of crankshafts having threaded end holes.

An additional object of the invention is to provide an installation tool for crankshaft harmonic balancers wherein selective threaded adapters may be quickly and readily installed within a common tool, and wherein an economical tool is provided for accommodating a wide variety of crankshafts.

In the practice of the invention the tool includes an elongated shaft exteriorly threaded throughout its length. The shaft includes an inner end which, during use, is located adjacent and coaxial to the nose end of an engine crankshaft. The shaft includes an outer end which is preferably provided with torque transfer means in the form of a pair of parallel wrench engaging flats.

The shaft is provided with a longitudinal bore throughout its length, and at its inner end a recess of a diameter larger than the bore is located. The recess is of a cylindrical configuration and selectively receives a threaded adapter of a length greater than the recess which has an exteriorly threaded portion capable of being threaded into the threaded hole located at the end of the crankshaft to be serviced. The adapted also includes an inner portion located within the shaft recess, and this inner portion has a recessed surface upon which indicia is located indicating the specifications of the particular adapter.

A bolt is rotatably received within the shaft bore, and the inner end thereof threads into a threaded bore defined in the adapter. The head of the bolt is located adjacent the outer end of the shaft, and tightening of the bolt firmly draws the adapter into the shaft recess affixing the adapter to the shaft in an integral assembly therewith.

The threaded shaft is mounted upon the end of the crankshaft by means of the adapter threading into the hole in the crankshaft end wherein the shaft is coaxially aligned with the crankshaft nose. A harmonic balancer is placed upon the shaft and initially aligned with the crankshaft end. Thereupon, an annular thrust bearing is slipped over the shaft, and a forcing nut is threaded upon the shaft threads against the thrust bearing. The thrust bearing is of a diameter greater than the bore of the balancer, and as the nut is rotated upon the shaft the thrust bearing is forced against the balancer forcing the balancer upon the crankshaft end.

Upon the balancer being fully installed upon the crankshaft the shaft may be rotated to unthread the adapter from the crankshaft threaded hole, and the tool is removed, the assembly of balancer and crankshaft being accomplished.

Accordingly, it will be appreciated that by selecting the proper adapter a single tool may be used with a wide variety of crankshafts, and as the adapters are of a relatively small size requiring little material a plurality of adapters may be packaged with a single shaft, bolt, thrust bearing and nut to provide a universal tool which may be readily used with a wide variety of crankshafts.

BRIEF DESCRIPTION OF THE DRAWINGS

The aforementioned objects and advantages of the invention will be appreciated from the following description and accompanying drawing wherein.

DESCRIPTION OF THE PREFERRED EMBODIMENT

Figure 2:
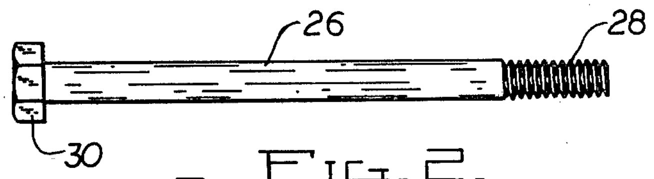
FIG. 2 is an elevational view of the bolt used with the tool.
Figure 1:
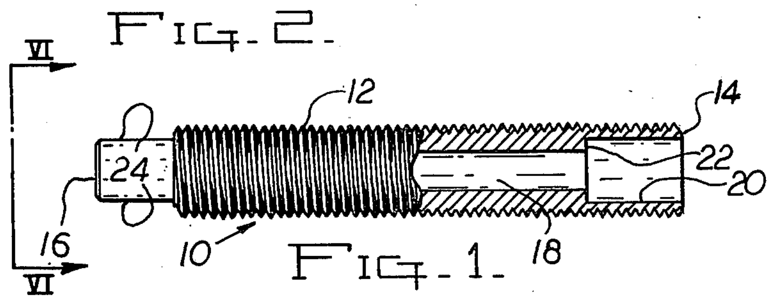
FIG. 1 is an elevational view, partially sectioned, of the shaft used with the invention.

The five components comprising a complete tool are shown in FIGS. 1–5, the primary component comprising the threaded shaft or screw 10. The shaft 10 is of an elongated configuration externally threaded at 12 throughout its outer diameter. The shaft includes an inner end 14, and an outer end 16, and a cylindrical bore 18 axially extends through the shaft. A cylindrical recess 20 is coaxially defined within the shaft intersecting the inner end 14, and the diameter of the recess is greater than that of the bore 18 wherein a transverse recess shoulder 22 is defined. The diameter of the shaft 10 is less than the diameter of the smallest crankshaft nose end with which the tool will be used insuring that the shaft will always be receivable within the bore of the installed harmonic balancer, as will be later apparent.

Figure 6:
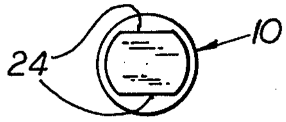
FIG. 6 is an end elevational view of the shaft as taken from the left of FIG. 1.

The outer end 16 of the shaft 10 is provided with torque transfer means consisting of parallel wrench engaging flats 24, FIG. 6, thereby providing means for rotating, or preventing rotation of, the shaft during installation of the adapter, balancer, or removal of the tool.

Figure 7:
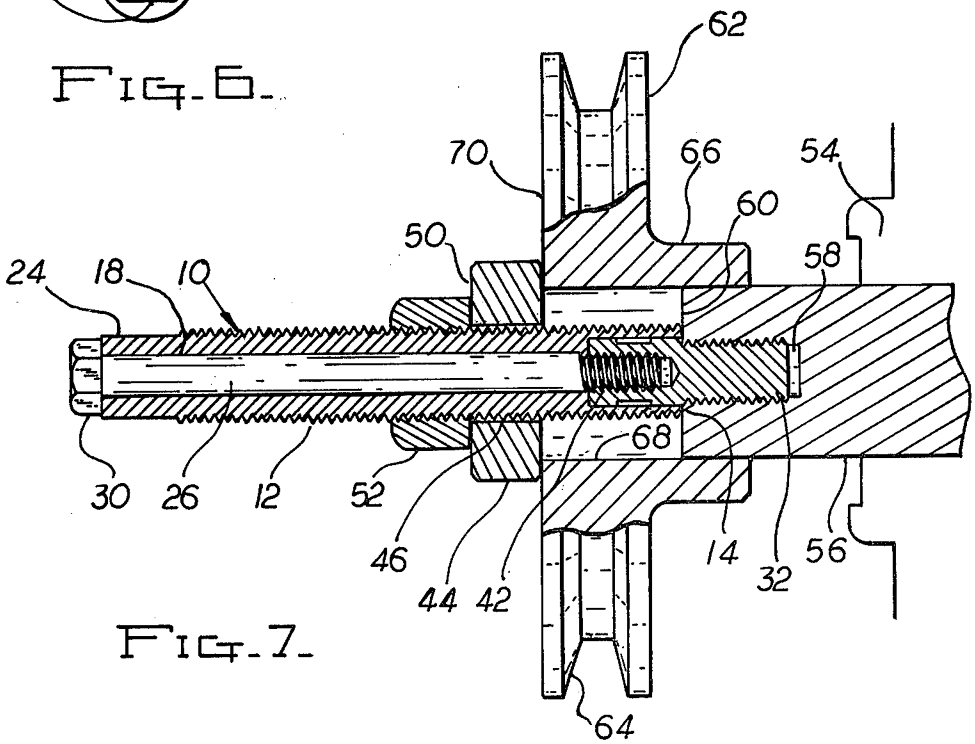
FIG. 7 is an assembly view, partially sectioned, illustrating use of the tool during installation of a balancer upon the end of a crankshaft.

A standard bolt 26 is rotatably receivable within the shaft bore 18, and is of such length that the threads 28 of the bolt will be located within the recess 20 when the hexagonal bolt head 30 is in engagement with the shaft outer end 16, as illustrated in FIG. 7.

Figure 3:
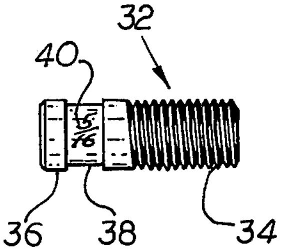
FIG. 3 is an elevational view of one of the threaded adapters constituting a part of the tool.

In FIG. 3 a threaded adapter 32 as used with the tool is illustrated. It is to be understood that a plurality of adapters 32 will be sold with each complete tool, and the threaded portions of the adapters will be provided with different sizes of threads, and may also be of variable diametrical sizes, in order to permit the tool to be used with a variety of crankshafts.

The adapter shown in FIG. 3 is of a generally cylindrical form, and includes an outer threaded portion 34, and an inner cylindrical portion 36. The inner portion of the adapter 32 is recessed at 38 to provide a cylindrical smooth surface upon which indicia 40 is located to indicate the specifications of the adapter, such as thread characteristics. Internally, the adapter is provided with a threaded bore 42 intersecting the inner end of the adapter and complimentary to the bolt threads 28. The diameter of the adapter inner portion 36 is only slightly less than the diameter of the shaft recess 20 and is receivable therein.

The thrust bearing 44 is of an annular configuration having a smooth bore 46, FIG. 7, of a diameter slightly greater than the diameter of the shaft 10 as to be axially slidable thereon, and the thrust bearing includes a flat radial face 48 adapted to engage the harmonic balancer during use, and the opposite flat radial face 50 is engaged by the forcing nut.

Figure 5:
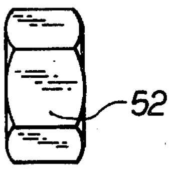
FIG. 5 is an elevational view of the forcing nut.
Figure 4:
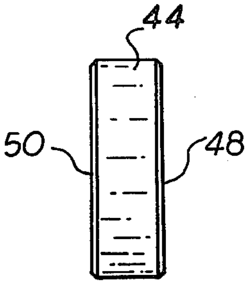
FIG. 4 is an elevational view of the thrust bearing.

The forcing nut 52, FIG. 5, comprises a conventional nut having an internal threaded bore for threadily engaging the shaft threads 12, and the nut is of an exterior hexagonal configuration of the known type.

In FIG. 7 a typical relationship of the assembled tool, engine crankshaft and harmonic balancer being installed thereon is shown. The engine crankshaft bearing structure is schematically represented at 54, and the nose end of 56 of the internal combustion engine crankshaft extends therethrough. The crankshaft end 56 is of a cylindrical configuration, and may include a keyway, or key, not shown, of conventional construction. A coaxial threaded hole 58 is defined in the crankshaft intersecting the crankshaft end surface 60, and this threaded hole will be or a particular size, and have particular thread characteristics, as determined by the crankshaft manufacturer.

The harmonic balancer 62 to be installed upon the crankshaft is generally in the form of a pulley having a belt groove 64 defined thereon, and the balancer includes a hub 66 having a cylindrical bore 68 defined thereon of a diameter substantially equal to the diameter of the crankshaft end. Vibration damping means, such as an elastomer element, not shown, is included in the construction of the balancer interposed between the hub and the outer portions of the balancer in which the belt groove is defined. A key slot, not shown, is usually defined in the hub bore 68.

In preparing the tool of the invention for use an adapter 32 is selected which has threads formed on outer portion 34 which are complimentary to the threads within the crankshaft hole 58. Upon the selection of the proper adapter, the adapter 32 is placed within the shaft recess 20 with the inner portion 36 located within the recess so that the adapter inner end engages the recess shoulder 22. The bolt 26 is inserted into the shaft bore 18 and threaded into the adapter bore 42 to tightly draw the adapter into the recess against the shoulder 22. During this assembly the bolt 26 is rotated through its hexagonal head 30 by a wrench, and the shaft 10 may be prevented from rotation by applying a wrench to flats 24.

Once the adapter 32 is firmly mounted within the shaft recess 20 the length of the adapter is such that the outer threaded portion 34 extends beyond the shaft inner end 14. Thus, the adapter may be readily threaded into the crankshaft hole 58, and may be threaded into the crankshaft hole sufficiently to abut the shaft inner end against the crankshaft end 60, although this abutting relationship is not necessary to operate the tool.

Once the adapter 32 is threaded into the crankshaft hole the harmonic balancer 62 is slipped over the outer end 16 of the shaft 10 and initially positioned and aligned on the end of the crankshaft nose 56. The balancer will be rotated to align its key or key slot, with the key, or key slot, formed on the crankshaft nose end, and at this time the thrust bearing 44 is slipped upon the shaft 10 wherein the bearing face 48 is brought into engagement with the balancer outer face 70. It is to be noted that the diameter of the thrust bearing 44 is greater than the diameter of the hub bore 68 to insure that the forces applied to the balancer will be axial and not tend to "cock" the balancer.

Thereupon, the forcing nut 52 is threaded upon the shaft 10, and by use of a wrench applied to the nut the nut is forced against the thrust bearing face 50 to force the thrust bearing to the right, FIG. 7, and push the balancer 62 upon the crankshaft end 56. Rotation of the forcing nut 52 continues until the balancer is fully mounted upon the crankshaft end.

To remove the tool the forcing nut 52 is usually slightly backed off from the thrust bearing 44, and a wrench applied to flats 24 permits the shaft 10 to be rotated in a counterclockwise direction unthreading the adapter 32 from the crankshaft hole 58. Such rotation of the shaft 10 continues until the adapter clears the hole 58, and the tool may then be removed.

Counter-rotation of the bolt 26 relative to the shaft 10 will loosen the adapter 32 within the recess 20, and the adapter may then be completely removed from the bolt and recess and stored for future use. The forcing nut 52 and thrust bearing 44 are also usually removed from the shaft 10 when the tool is not in use.

It will be appreciated that the sequence of installing the balancer upon the crankshaft may vary slightly from that described above. For instance, the balancer 62 may be initially oriented relative to the crankshaft end 56 prior to the adapter 32 being screwed into the end of the crankshaft. In such event, the forcing nut 52 and thrust bearing 44 may already be located upon the shaft 10, but will be located adjacent the outer end 16 so as not to interfere with the balancer during the mounting of the shaft 10 upon the crankshaft.

The aforedescribed tool is easily usable within the relatively confined quarters within an engine compartment, and the use of the tool permits the balancer to be properly positioned upon the crankshaft without binding as a purely axial force is imposed upon the balancer as it is pushed upon the crankshaft nose end. The use of a plurality of adapters 32 having various thread characteristics and threaded portion sizes permits the tool to be universal in its use with a wide variety of crankshafts, significantly reducing the cost of this type of tool while improving the flexibility of usage.

It is appreciated that various modifications to the inventive concepts may be apparent to those skilled in the art without departing from the spirit and scope of the invention.

I claim:

1. A tool for installing a harmonic balancer upon the end of an engine crankshaft wherein the balancer includes a hub having a bore defined thereon adapted to receive the crankshaft and an exterior face transversely intersecting the hub base, and the crankshaft having an axial threaded hole intersecting its end, comprising, in combination, an exteriorly threaded shaft having a diameter less than that of the balancer hub bore, an inner end, an outer end, and an axial bore intersecting said inner and outer ends, a coaxial recess defined in said shaft intersecting said inner end and shaft bore having a diameter greater than said shaft bore and a radial shoulder, an adapter received within said recess having an exteriorly threaded portion extending beyond said shaft inner end adapted to mate with the threads of the threaded crankshaft hole and having an internally threaded axial bore in alignment with and exposed to said shaft axial bore, a bolt rotatably received within said shaft bore having a threaded end threaded into said adapter axial bore and a headed end disposed adjacent said shaft outer end permitting rotation of said bolt to tightly draw said adapter against said recess radial shoulder to retain said adapter within said shaft recess, and thrust means threaded upon the exterior of said shaft adapted to bear against the balancer exterior face and force the balancer upon the end of the crankshaft when the shaft extends through the balancer hub bore and said adapter is threaded into the crankshaft threaded hole.

2. In a tool for installing a harmonic balancer as in claim 1 wherein said thrust means comprises an annular thrust bearing axially slidably mounted upon said threaded shaft engageable with the balancer exterior face and having a diameter greater than that of the balancer bore, and a nut mounted upon said shaft mating with the exterior threads thereof bearing against said thrust bearing to axially force said thrust bearing against the balancer face.

3. In a tool for installing a harmonic balancer as in claim 2, torque transfer means defined upon said shaft adjacent said outer end thereof for imposing torque forces upon said shaft about the axial length thereof.

4. In a tool for installing a harmonic balancer as in claim 3 wherein said torque transfer means comprises a pair of parallel wrench receiving flats defined upon said shaft adjacent said shaft outer end.

5. In a tool for installing a harmonic balancer as in claim 1 wherein said shaft recess is cylindrical and said adapter comprises a cylindrical member having an exterior surface including a threaded outer portion and an indicia bearing inner portion received within said shaft means.

6. In a tool for installing a harmonic balancer as in claim 5 wherein said adapter exterior surface inner portion includes a recessed surface, and indicia defined upon said recessed surface.

* * * * *